(12) United States Patent
Kojima et al.

(10) Patent No.: US 8,803,787 B2
(45) Date of Patent: Aug. 12, 2014

(54) LIQUID CRYSTAL DISPLAY APPARATUS

(75) Inventors: Tetsuya Kojima, Ishikawa-gun (JP);
Kazuhiro Nishiyama, Kanazawa (JP)

(73) Assignee: Japan Display Inc., Tokyo (JP)

( * ) Notice: Subject to any disclaimer, the term of this patent is extended or adjusted under 35 U.S.C. 154(b) by 1031 days.

(21) Appl. No.: 12/212,104

(22) Filed: Sep. 17, 2008

(65) Prior Publication Data

US 2009/0073343 A1    Mar. 19, 2009

(30) Foreign Application Priority Data

Sep. 18, 2007   (JP) ................. 2007-241473

(51) Int. Cl.
G09G 3/36    (2006.01)
(52) U.S. Cl.
USPC ........................................ 345/102
(58) Field of Classification Search
USPC ........... 345/89, 94–95, 101–103; 349/72, 199
See application file for complete search history.

(56) References Cited

U.S. PATENT DOCUMENTS

| 2006/0290632 | A1 | 12/2006 | Shibusawa | |
| 2007/0091056 | A1 * | 4/2007 | Okita et al. ................... | 345/102 |
| 2007/0103425 | A1 * | 5/2007 | Tanaka et al. ................. | 345/102 |

FOREIGN PATENT DOCUMENTS

| JP | 2002-202491 | | 7/2002 |
| JP | 2002-366124 | A | 12/2002 |
| JP | 2003-295156 | A | 10/2003 |
| JP | 2004-163828 | | 6/2004 |
| JP | 2007-163701 | A | 6/2007 |
| JP | 2007-163706 | A | 6/2007 |
| JP | 2007-286135 | A | 11/2007 |
| TW | 1286244 | | 9/2007 |
| TW | 1286638 | | 9/2007 |

OTHER PUBLICATIONS

Office Action issued Jul. 17, 2012 in Japanese Patent Application No. 2008-239501 with English language translation.
Office Action issued Mar. 12, 2013 in Taiwanese Application No. 097135849 (With English Translation).

* cited by examiner

*Primary Examiner* — Jonathan Horner
(74) *Attorney, Agent, or Firm* — Oblon, Spivak, McClelland, Maier & Neustadt, L.L.P.

(57) ABSTRACT

A liquid crystal display apparatus includes a display panel which a plurality of pixel lines each having a plurality of liquid crystal pixels, an illumination light source which illuminates the display panel, and a display control section which outputs a signal voltage sequentially to the pixel lines to write a video signal, and which controls ON/OFF of the illumination light source, wherein the display control section includes, a temperature detector which detects temperature information, and a timing control section which lights the illumination light source after a video signal writing operation into a predetermined pixel line is completed when the temperature information is a first temperature, and which lights the illumination light source before the video signal writing operation into a predetermined pixel line is completed when the temperature information is a second temperature that is lower than the first temperature.

12 Claims, 7 Drawing Sheets

| Temperature | Backlight duty |
|---|---|
| −40 | 95% |
| −30 | 80% |
| −20 | 72% |
| −10 | 70% |
| 0 | 68% |
| 10 | 66% |
| 20 | 64% |
| 30 | 62% |
| 40 | 61% |
| 50 | 60% |
| 60 | 58% |
| 70 | 56% |
| 80 | 54% |
| 90 | 52% |
| 100 | 50% |

| Temperature (°C) | Backlight duty (%) | Black insertion ratio (%) | Scanning duty (%) | Lighting start timing of backlight 1 (%) | Lighting start timing of backlight 2 (%) |
|---|---|---|---|---|---|
| 60 | 50 | 40 | 33 | 56.5 | 73 |
| 25 | 60 | 25 | 33 | 43 | 60 |
| 0 | 65 | 16 | 54 | 43 | 70 |
| -30 | 80 | 13 | 61 | 30.5 | 61 |

FIG. 9

LIQUID CRYSTAL DISPLAY APPARATUS

CROSS-REFERENCE TO RELATED APPLICATIONS

This application is based upon and claims the benefit of priority from prior Japanese Patent Application No. 2007-241473, filed Sep. 18, 2007, the entire contents of which are incorporated herein by reference.

BACKGROUND OF THE INVENTION

1. Field of the Invention

The present invention relates to a liquid crystal display apparatus.

2. Description of the Related Art

The liquid crystal display apparatus is widely utilized as a display apparatus for a computer, a car navigator system, a television set and the like. A liquid crystal display apparatus generally includes a liquid crystal display panel having a plurality of matrix arrays of liquid crystal of pixels, a backlight for illuminating the liquid crystal display panel, and a display control circuit for controlling the backlight and these display panels. The liquid crystal display panel has a liquid crystal layer held between an array substrate and a counter-substrate.

The array substrate includes a plurality of pixel electrodes disposed in substantially a matrix form, a plurality of gate lines disposed along a plurality of lines of pixel electrodes, a plurality of source lines disposed along a plurality of rows of pixel electrodes, and a plurality of switching elements disposed near intersections of the plurality of gate lines and the plurality of source lines. Each switching element includes a thin film transistor (TFT), and when one gate line is driven, the switching element conducts and applies potential of one source line to one pixel electrode. The counter-substrate is provided with a common electrode such that it is opposed to the plurality of pixel electrodes disposed on the array substrate. One pixel electrodes and the common electrode constitute a pixel together with a pixel region which is a portion of a liquid crystal located between these electrodes, and controls liquid crystal molecule array in the pixel region by an electric field between the pixel electrode and the common electrode. The display control circuit includes a gate driver which drives the plurality of gate lines, a source driver which drives the plurality of source lines, and a controller circuit which controls the gate driver, the source driver and the backlight.

When the liquid crystal display apparatus is for a television set which mainly shows a moving image, a liquid crystal display panel of an OCB (Optically Compensated Bend) mode in which liquid crystal molecules show excellent response is used.

In the liquid crystal display panel, alignment becomes splay alignment which is almost lying before power is supplied by an alignment film which liquid crystals are rubbed in parallel to each other on the pixel electrodes and the common electrode. The liquid crystal display panel transitions these liquid crystals from the splay alignment to the bend alignment and displays information by relatively strong electric fields which are applied in initializing processing upon supply of power.

The reason why the liquid crystals become splay alignment before power is supplied is that the splay alignment is more stable than the bend alignment in terms of energy in a voltage-non-applied state of liquid crystal driving voltage. A liquid crystal has a property that even if the liquid crystal once transitions to the bend alignment, it reversely transitions to the splay alignment again when a voltage-applied state which is equal to or lower than a level in which the splay alignment energy and the bend alignment energy are competition with each other or a voltage-non-applied state is continued for a long term. Since the splay alignment has quite different characteristics from those of the bend alignment, abnormal display occurs.

Conventionally, to prevent the bend alignment from being reversely transitioned to the splay alignment, there is employed a driving system in which a large voltage is applied to a liquid crystal in a portion of a frame period during which one frame image is displayed. In a normally white liquid crystal display panel, this voltage corresponds to a pixel voltage of black display, and this system is called black insertion driving (Jpn. Pat. Appln. KOKAI Publication No. 2002-202491).

When the liquid crystal display apparatus is used under a low temperature environment, since viscosity of the liquid crystal is increased, the response of the liquid crystal is deteriorated, and a liquid crystal voltage does not reach a target value within predetermined time. This phenomenon is also generated both when a high voltage is applied to carry out black display and when a low voltage is applied to carry out white display. Therefore, if these states are compared with a display state at the room temperature, brightness is lowered in the white display and the screen does not become black sufficiently in the black display.

BRIEF SUMMARY OF THE INVENTION

A liquid crystal display apparatus according to a first aspect of the present invention comprises: a display panel which has a plurality of pixel lines each having a plurality of liquid crystal pixels; an illumination light source which illuminates the display panel; and a display control section which outputs a signal voltage corresponding to an input video signal sequentially to the pixel lines to write a video signal, and which controls ON/OFF of the illumination light source, wherein the display control section includes: a temperature detector which detects temperature information; and a timing control section which lights the illumination light source after a video signal writing operation into a predetermined pixel line of the display panel is completed when the temperature information in the temperature detector is a first temperature, and which lights the illumination light source before the video signal writing operation into a predetermined pixel line of the display panel is completed when the temperature information in the temperature detector is a second temperature that is lower than the first temperature.

A liquid crystal display apparatus according to a second aspect of the present invention comprises: a display panel which has a plurality of pixel lines each having a plurality of liquid crystal pixels; a plurality of illumination light sources which are optically divided at least into two in a direction orthogonal to the pixel line which illuminates the display panel; and a display control section which outputs a signal voltage corresponding to an input video signal sequentially to the pixel lines to write a video signal, and which controls ON/OFF of the illumination light source, wherein the display control section includes: a temperature detector which detects temperature information; and a timing control section which lights the illumination light source in a corresponding region after a video signal writing operation into a predetermined pixel line of the display panel is completed when the temperature information in the temperature detector is a first temperature, and which lights the illumination light source in a corresponding region before the video signal writing operation into a predetermined pixel line of the display panel is completed when the temperature information in the temperature detector is a second temperature that is lower than the first temperature.

A liquid crystal display apparatus according to a third aspect of the present invention comprises: a display panel which has a plurality of pixel lines each having a plurality of liquid crystal pixels; a plurality of illumination light sources which are optically divided at least into two in a direction orthogonal to the pixel line which illuminates the display panel; and a display control section which outputs a signal voltage corresponding to an input video signal to the display panel after non-video signals are sequentially written on the pixel line by outputting a signal voltage corresponding to a non-video signal to the display panel, thereby sequentially writes the video signal on the pixel line, and which controls ON/OFF of the illumination light source, wherein the display control section includes: a temperature detector which detects temperature information; and a timing control section which lights the illumination light source in a corresponding region after a video signal writing operation into a predetermined pixel line of the display panel is completed when the temperature information in the temperature detector is a first temperature, and which lights the illumination light source in a corresponding region before the video signal writing operation into a predetermined pixel line of the display panel is completed when the temperature information in the temperature detector is a second temperature that is lower than the first temperature.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 9 is a diagram showing one example of a table in which temperatures, the backlight duty and a black insertion ratio are defined.

DETAILED DESCRIPTION OF THE INVENTION

First Embodiment

Hereafter, referring to the attached drawings, a liquid crystal display apparatus according to an embodiment of the present invention will be explained.

Figure 1:
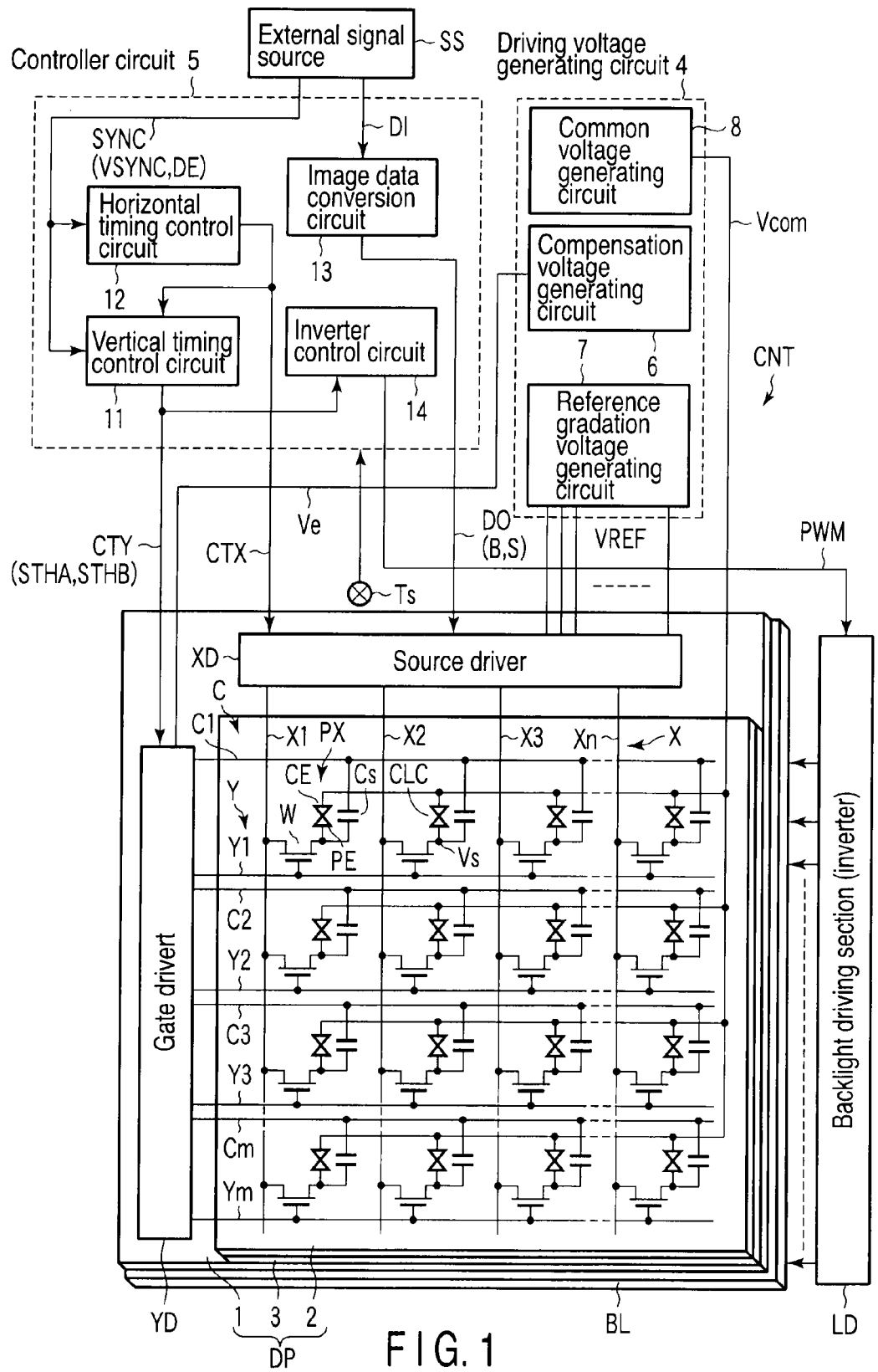
FIG. 1 is a schematic circuit diagram of a liquid crystal display apparatus.

FIG. 1 is a schematic circuit diagram of a liquid crystal display apparatus.

The liquid crystal display apparatus includes a liquid crystal display panel DP, a backlight BL which illuminates the display panel DP, a display control circuit CNT which controls the display panel DP and the backlight BL, and a temperature sensor Ts which measures a temperature of the liquid crystal display panel DP.

The liquid crystal display panel DP has such a structure that a liquid crystal layer 3 is held between an array substrate 1 and a counter-substrate 2 which are a pair of electrode substrates. The liquid crystal layer 3 includes, as liquid crystal material, a liquid crystal which previously transitions from the splay alignment to the bend alignment for normally white display operation and in which reverse transition from the bend alignment to the splay alignment is prevented by a voltage which is periodically applied and which becomes black display.

The display control circuit CNT controls a transmittance of the liquid crystal display panel DP by a liquid crystal driving voltage applied from the array substrate 1 and the counter-substrate 2 to the liquid crystal layer 3. The transition from the splay alignment to the bend alignment is obtained by applying a relatively large electric field to the liquid crystal at predetermined initializing processing which is carried out by the display control circuit CNT when power is supplied.

The display control circuit CNT is configured to control the driving timing of the liquid crystal display panel DP and a duty ratio of backlight BL based on the temperature of the liquid crystal display panel DP measured by the temperature sensor Ts.

Figures 2, 5:
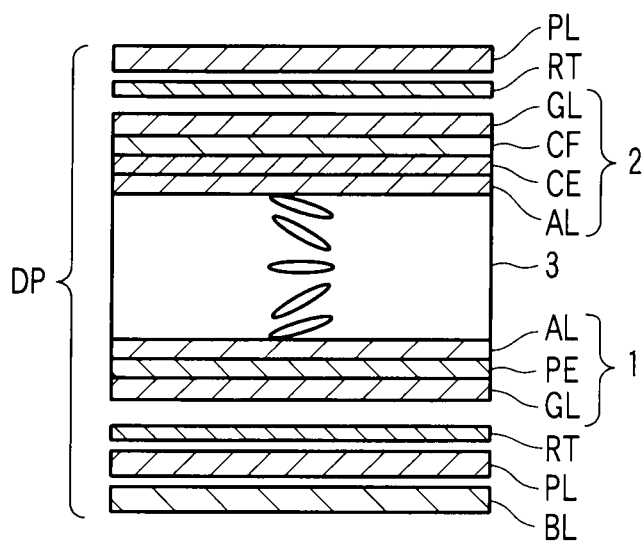
FIG. 2 is a diagram showing a detailed cross section structure of a liquid crystal display panel.
FIG. 5 is a diagram showing one example of a table in which temperatures and a backlight duty ratio are defined.

FIG. 2 is a diagram showing a detailed cross section structure of a liquid crystal display panel DP.

The array substrate 1 includes a transparent insulating substrate GL comprising a glass plate and the like, a plurality of pixel electrodes PE formed on the transparent insulating substrate GL, and alignment films AL formed on the pixel electrodes PE.

The counter-substrate 2 includes a transparent insulating substrate GL comprising a glass plate, a color filter layer CF formed on the transparent insulating substrate GL, a common electrode CE formed on the color filter layer CF, and an alignment film AL formed on the common electrode CE.

The liquid crystal layer 3 is obtained by charging liquid crystals into a gap between the counter-substrate 2 and the array substrate 1.

The color filter layer CF includes a red coloring layer for a red pixel, a green coloring layer for a green pixel, a blue coloring layer for a blue pixel, and a black coloring (light-proof) layer for a black matrix.

In FIG. 2, a liquid crystal molecule 19 is in the splay alignment. The liquid crystal display panel DP includes a pair of retardation films RT disposed outside of the array substrate 1 and the counter-substrate 2, a pair of polarizers PL disposed outside of the retardation films RT, and a light source backlight BL disposed outside of the polarizer PL on the side of the array substrate 1.

The alignment film AL on the side of the array substrate 1 and the alignment film AL on the side of the counter-substrate 2 are subjected to rubbing treatment in parallel to each other. With this, a pre-tilt angle of the liquid crystal molecule is set to about 10°.

In the array substrate 1, the plurality of pixel electrodes PE are disposed in a form of the matrix on the transparent insulating substrate GL. A plurality of gate lines Y (Y1 to Ym) are disposed along the plurality of lines of the pixel electrodes PE, and the plurality of source lines X (X1 to Xn) are disposed along the plurality of rows of the pixel electrodes PE.

A plurality of pixel switching elements W are disposed near the intersections between the gate lines Y and the source lines X. Each pixel switching element W comprises a thin film transistor in which the gate is connected to the gate line Y and a source drain path is connected between the source line X and the pixel electrode PE. When the pixel switching element W is driven through a corresponding gate line Y, a corresponding source line X and a corresponding pixel electrode PE are conducted.

The pixel electrode PE and the common electrode CE are made of transparent electrode material such as ITO, they are covered with alignment films AL, and they constitute a liquid crystal pixel PX together with a pixel region which is a portion of the liquid crystal layer 3 controlled by a row of the liquid crystal molecules corresponding to an electric field from the pixel electrode PE and the common electrode CE.

A plurality of the liquid crystal pixels PX include a liquid crystal capacitance CLC between each pixel electrode PE and the common electrode CE. A plurality of auxiliary capacitance lines C1 to Cm are capacitance coupled to the pixel electrodes PE of the liquid crystal pixels PX of corresponding lines to constitute an auxiliary capacitance Cs. The auxiliary capacitance Cs includes a sufficiently large capacitance value with respect to a parasitic capacitance of the pixel switching element W.

The display control circuit CNT includes a gate driver YD, a source driver XD, a backlight driving section LD, a driving voltage generating circuit 4 and a controller circuit 5.

The gate driver YD sequentially drives a plurality of gate lines Y1 to Ym such as to conduct the plurality of switching elements W on a line basis. The source driver XD outputs a pixel voltage Vs to the plurality of source lines X1 to Xn in a period during which the switching element W in each line is conducted by driving of the corresponding gate line Y. The backlight driving section LD drives the backlight BL. The driving voltage generating circuit 4 generates a voltage for driving the display panel DP. The controller circuit 5 controls the gate driver YD, the source driver XD and the backlight driving section (inverter) LD.

A driving voltage generating circuit 4 includes a compensation voltage generating circuit 6, a reference gradation voltage generating circuit 7 and a common voltage generating circuit 8. The compensation voltage generating circuit 6 generates compensation voltage Ve which is applied to the auxiliary capacitance line C. The reference gradation voltage generating circuit 7 generates predetermined reference gradation voltage VREF used for the source driver XD. The common voltage generating circuit 8 generates common voltage Vcom applied to an opposite electrode CT.

The controller circuit 5 includes a vertical timing control circuit 11, a horizontal timing control circuit 12, an image data conversion circuit 13 and an inverter control circuit 14.

The vertical timing control circuit 11 generates a control signal CTY for the gate driver YD based on a synchronization signal SYNC (VSYNC, DE) which is input from an external signal source SS. The horizontal timing control circuit 12 generates a control signal CTX for the source driver XD based on the synchronization signal SYNC(VSYNC, DE) which is input from the external signal source SS. The image data conversion circuit 13 sequentially stores image data which is input from the external signal source SS in a memory, and sequentially outputs data corresponding to a reverse transition preventing voltage, e.g., black insertion fixing pixel data B corresponding to black display and gradation display variable pixel data S corresponding to pixel data DI in synchronization with timing of the vertical timing control circuit 11 and the horizontal timing control circuit 12. The inverter control circuit 14 controls the backlight driving section (inverter) LD based on the control signal CTY which is output from the vertical timing control circuit 11.

The image data comprising a plurality of pixel data sets DI with respect to the plurality of liquid crystal pixels PX, and is renewed every one frame period (vertical scanning period V). The control signal CTY is supplied to the gate driver YD, and the control signal CTX is supplied to the source driver XD together with pixel data DO which is obtained as a conversion result from the image data conversion circuit 13. The control signal CTY is used for allowing the gate driver YD to drive the gate line Y sequentially as described above. The control signal CTX allocates the pixel data DO which is obtained on one line liquid crystal pixel PX basis and output serially to the plurality of source lines X as a conversion result of the image data conversion circuit 13, and is used for allowing the source driver XD to designate an output polarity.

The gate driver YD and the source driver XD are constituted using a shift register circuit for selecting the gate line Y and the source line X, respectively.

In this case, the control signal CTY includes a first start signal (gradation display start signal) STHA, a second start signal (black insertion start signal) STHB, a clock signal and an output enable signal.

The first start signal (gradation display start signal) STHA controls gradation display start timing. The second start signal (black insertion start signal) STHB controls black insertion start timing. The clock signal shifts the start signals STHA and STHB. The output enable signal controls outputs of driving signals to gate lines Y1 to Ym in correspondence with holding positions of the start signals STHA and STHB by the shift register circuit.

On the other hand, the control signal CTX includes a start signal, a clock signal, a load signal and a polarity signal.

The start signal controls capture start timing of pixel data for one line. The clock signal shifts the start signal in a shift register circuit. The load signal controls a parallel output timing of pixel data DO for one line which is captured for the source lines X1 to Xn selected by the shift register circuit one by one in correspondence with the holding position of the start signal. The polarity signal controls a signal polarity of the pixel voltage Vs corresponding to the pixel data.

The gate driver YD sequentially selects the gate lines Y1 to Ym for the black insertion and gradation display in one frame period by the control of the control signal CTY, and supplies an ON voltage to a selection gate line Y as a driving signal which conducts the pixel switching element W in each line for one horizontal scanning period H.

The black insertion fixing pixel data B is sequentially output from the image data conversion circuit 13 over ⅓ period of one frame period, and gradation display variable pixel data S for one line is sequentially output from the image data conversion circuit 13 over next ⅓ period. The source driver XD refers to a predetermined number of reference gradation voltage VREF supplied from the reference gradation voltage generating circuit 7, converts the pixel data B and S into pixel voltage Vs, and outputs the same to the plurality of source lines X1 to Xn in parallel. That is, scanning duties of black insertion and moving image writing to 33%, and the black insertion ratio also becomes 33%.

The pixel voltage Vs is voltage which is applied to the pixel electrode PE as in which the common voltage Vcom of the common electrode CE is used as a reference, and the pixel voltage Vs is inversed in polarity with respect to the common voltage Vcom to drive frame inversion and line inversion.

When switching element W for one line is not conducted, the compensation voltage Ve is applied to the auxiliary capacitance line C corresponding to the gate line Y connected to the switching element W through the gate driver YD, and the compensation voltage Ve is used for compensating variation of the pixel voltage Vs generated in pixel Px for one line by the parasitic capacitance of the switching element W.

When the gate driver YD drives the gate line Y1 by ON voltage and conducts all of the pixel switching elements W connected to the gate line Y1, pixel voltage Vs on the source lines X1 to Xn is supplied to the corresponding pixel electrode PE and one end of the auxiliary capacitance Cs through the pixel switching element W.

In addition, the gate driver YD outputs the compensation voltage Ve from the compensation voltage generating circuit 6 to the storage capacitance line C1 that corresponds to the gate line Y1, turns on all pixel switching elements W, which are connected to the gate line Y, only during one horizontal scanning period, and outputs, immediately thereafter, an OFF voltage for turning off these pixel switching elements W, to the gate line Y1. When these pixel switching elements W are turned off, the compensation voltage Ve reduces the amount of charge that is to be extracted from the pixel electrodes PE due to the parasitic capacitances of the pixel switching elements W, thereby substantially canceling a variation in pixel voltage Vs, that is, a field-through voltage ΔVp.

Figure 3:
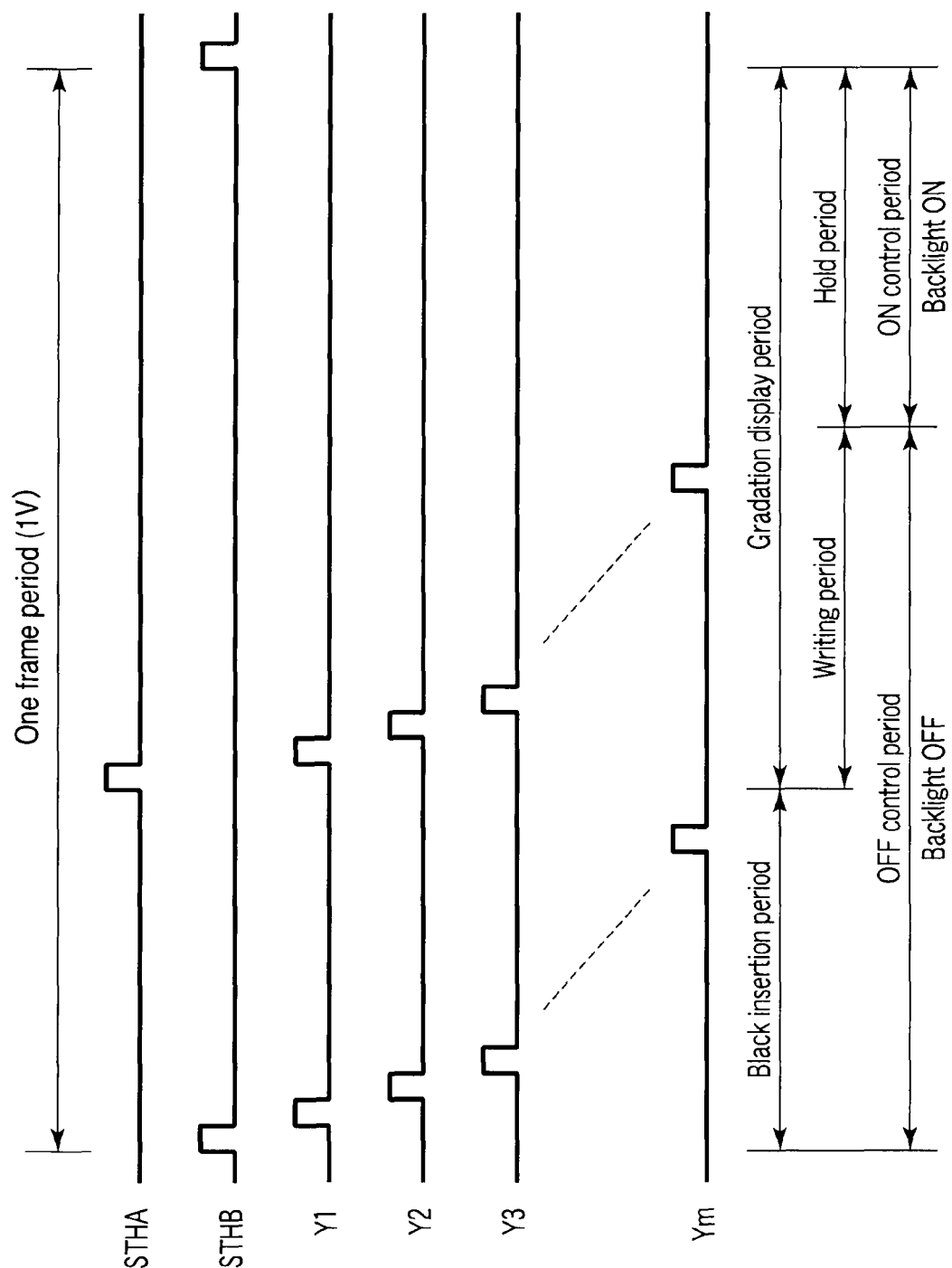
FIG. 3 is a time chart showing a driving operation of the liquid crystal display apparatus.

Next, the operation of the liquid crystal display apparatus will be explained with reference to the time chart shown in FIG. 3.

Both a first start signal STHA and a second start signal STHB are pulses which are input to the gate driver YD. In FIG. 3, the first start signal STHA is input in accordance with a determined black insertion ratio, delayed from the second start signal STHB.

The black insertion ratio is a ratio of a hold period (i.e., black insertion period, in other words, non-gradation display period) of fixed pixel voltage for black insertion with respect to one frame period (1V: vertical scanning period). A period during which a variable pixel voltage for gradation display is held is a hold period (i.e., gradation display period).

The gate driver YD sequentially shifts the second start signal STHB such as to realize the scanning duty of 33% over ⅓ period of one frame period, selects the plurality of gate lines Y1 to Ym per scanning period H of one horizontal scanning period one by one, and outputs driving signals to the gate lines Y1, Y2, Y3, . . . . In correspondence with this, the source driver XD converts the black insertion fixing pixel data B, B, B, B, . . . for each into pixel voltage Vs, and outputs them in parallel to the source lines X1 to Xn with polarity inverted every 1H. The pixel voltage Vs is supplied to the liquid crystal pixels PX of a first line, a second line, a third line, . . . while each of the gate lines Y1 to Ym is driven in the corresponding 1H period. Driving signals are output to the gate lines Y1, Y2, Y3, . . . based on the second start signal STHB, and the period during which this is held is a black insertion period.

Subsequent to the black insertion period, the first start signal STHA is sequentially shifted over ⅓ period of the subsequent one frame period to realize the scanning duty of 33%, selects the plurality of gate lines Y1 to Ym one by one per one horizontal scanning period H, and sequentially outputs driving signals to the gate lines Y1, Y2, Y3 . . . . In correspondence with this, the source driver XD converts the gradation display variable pixel data S1, S2, S3, . . . for each into pixel voltage Vs, and outputs them in parallel to the source lines X1 to Xn with polarity inverted every 1H. These pixel voltage Vs are supplied to liquid crystal pixels PX of a first line, a second line, a third line, a fourth line, . . . while the gate lines Y1 to Ym are driven in the corresponding 1H period. A period during which driving signals are output to the gate lines Y1, Y2, Y3, . . . based on the first start signal STHA is called a writing period within a gradation display period.

The driving signals are not output to the gate lines Y1, Y2, Y3, . . . until the one frame period is elapsed after the writing period, and liquid crystal pixel PX holds the supplied pixel voltage Vs. This period is called a hold period within the gradation display period.

As the driving system, a blinking driving system in which the backlight BL blinks during one frame period is employed. When this driving system is employed, black display in the black insertion period is blackened more and excellent moving image visibility is obtained. When the blinking driving system is employed, power consumption is reduced as compared with a case in which the backlight BL is always lit.

Figure 4:
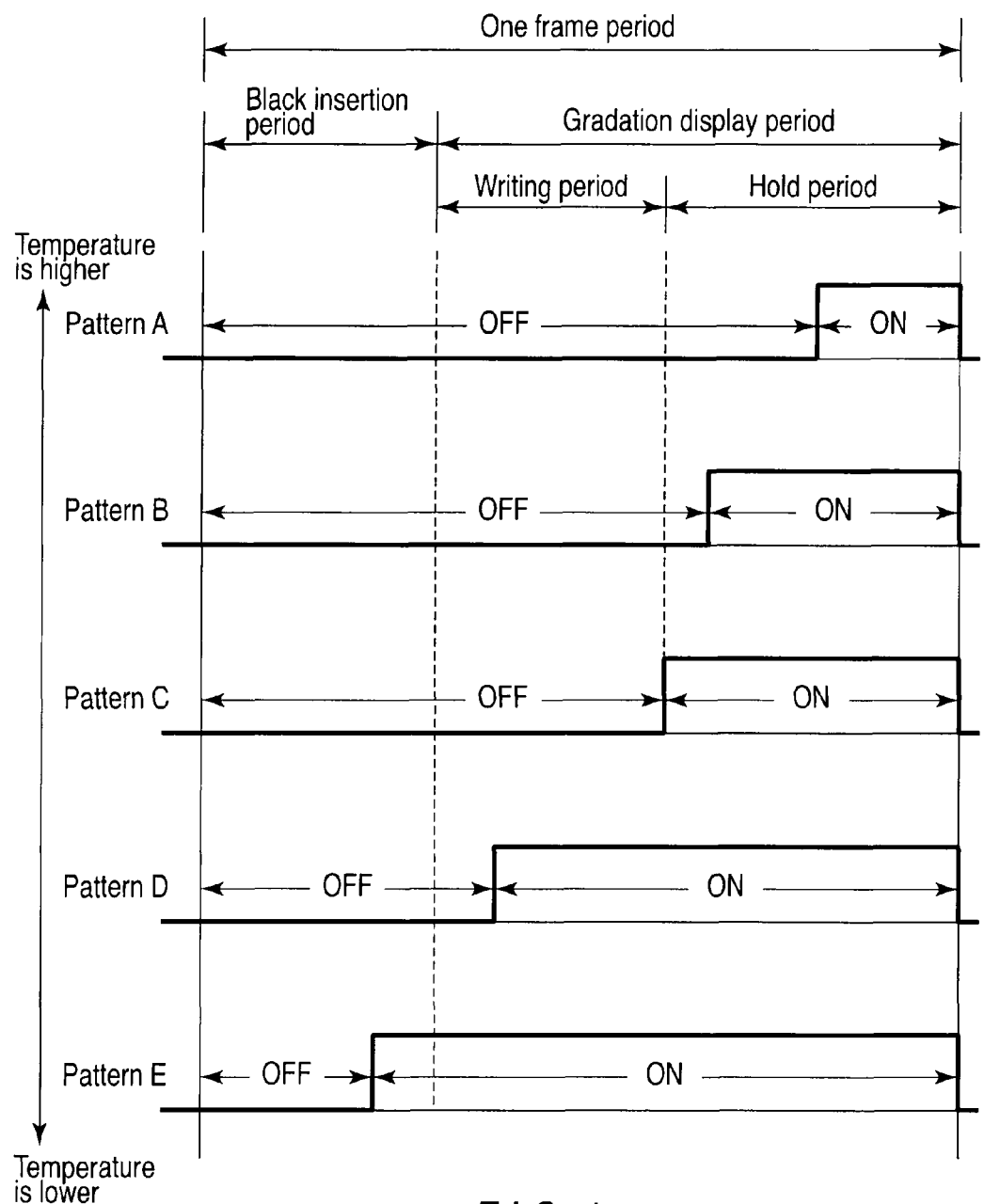
FIG. 4 is a diagram for explaining a control method of a backlight illumination time period by a temperature of the liquid crystal display panel.

In this embodiment, the inverter control circuit 14 outputs a pulse duration modulation signal PWM to the backlight driving section LD to light the backlight BL during the hold period, and the inverter control circuit 14 outputs a pulse duration modulation signal PWM which corresponds to a temperature of the liquid crystal display panel DP measured by the temperature sensor Ts to the backlight driving section LD. That is, as shown in FIG. 4, the inverter control circuit 14 controls the backlight illumination time period by the temperature of the liquid crystal display panel DP. FIG. 4 shows, in the vertical direction, the illumination time period of the backlight BL corresponding to the temperature by means of patterns A to E.

At a normal temperature, the illumination time period substantially matches with the hold period as shown in the pattern C. As the temperature is lowered, the illumination time period starts during the image writing period in the pattern D of an extremely low temperature environment in which the temperature is lower than 0° C. If the temperature is further lowered, the illumination time period starts during the black insertion period in the pattern E. In the patterns A and B in which the temperature is increased, the illumination time period starts from an intermediate portion of the hold period.

Such operation can be realized by controlling the light modulation by inverter control circuit 14 while referring to a table in which the temperature and the backlight duty ratio are defined. FIG. 5 is a diagram showing one example of a table in which the temperature and the backlight duty ratio are defined.

Figure 6:
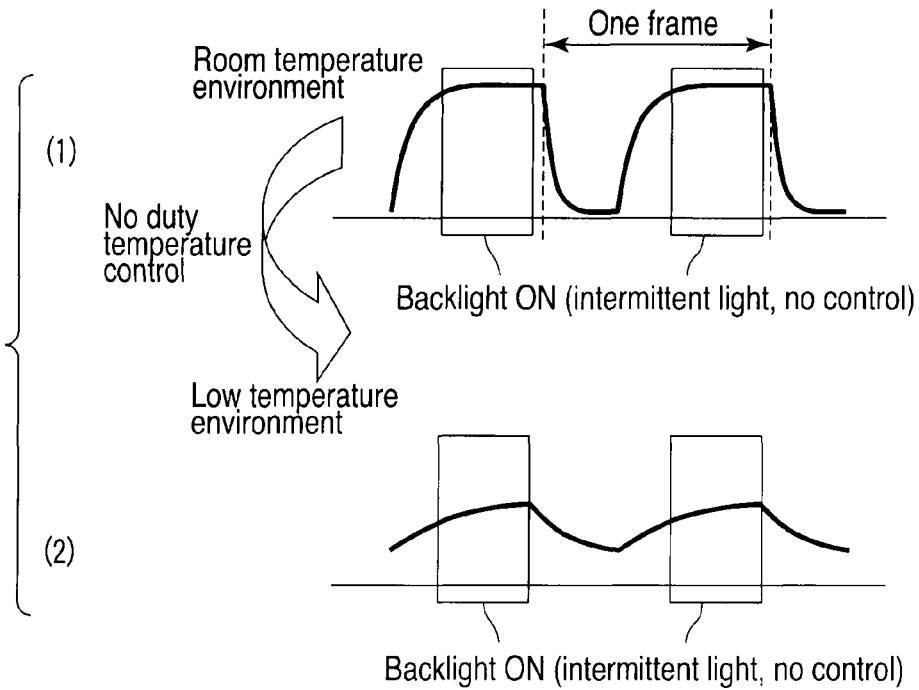
FIG. 6 is a diagram showing a response state of a liquid crystal when a temperature control of the backlight duty is not carried out.

FIG. 6 shows a response state of liquid crystal when the temperature control of the backlight duty is not carried out. FIG. 6(1) shows a response in a normal temperature state, and FIG. 6(2) shows a response in a low temperature state. The vertical axis shows transmittance, and the lateral axis shows time elapsed from left to right. Thick lines in the drawings show variation in brightness of liquid crystal at the time of gradation display and black insertion. The brightness is reduced by start of black insertion and the brightness is increased by start of gradation display, and this phenomenon is repeated. Thin solid lines in the drawing show the illumination time period of the backlight BL.

As shown in FIG. 6(2), under the low temperature environment, since the response of liquid crystal is deteriorated, a phenomenon in which the liquid crystal voltage does not reach the target value within predetermined time occurs. This phenomenon occurs both when high voltage is added and black display is carried out and when low voltage is added and white display is carried out. Thus, if this is compared with a display state at a room temperature, it can be found that the brightness is reduced in the white display and black level is not enough in the black display.

Thus, if the duty ratio of the backlight BL is fixed, the white brightness under the low temperature environment is reduced largely.

Figure 7:
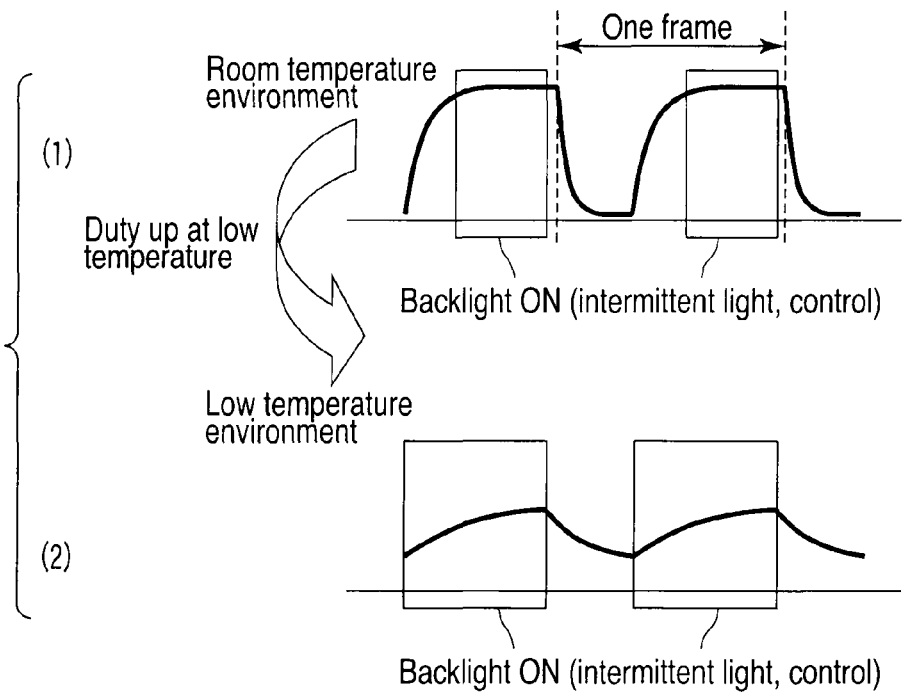
FIG. 7 is a diagram showing a response state of a liquid crystal when the temperature control of the backlight duty is carried out.

FIG. 7 shows a response state of liquid crystal when temperature control of backlight duty is carried out. FIG. 7(1) shows a response at a normal temperature and FIG. 7(2) shows a response at a low temperature.

As shown in FIG. 7(2), the duty ratio of the backlight BL is increased. At a low temperature, since the response of the liquid crystal becomes slow, even if the backlight duty is widened, it is possible to prevent the white brightness from being reduced without largely deteriorating the black brightness.

Second Embodiment

A liquid crystal display apparatus of a second embodiment is the same as that of the first embodiment shown in FIG. 1 except that lighting timing of the backlight BL, a black insertion ratio and the like of the display control circuit CNT can be varied in accordance with a temperature detected by the temperature sensor Ts, and the second embodiment has a plurality of backlight light sources. The same portions as those of the first embodiment are designated with the same symbols, and detailed explanation thereof will be omitted.

Figure 8:
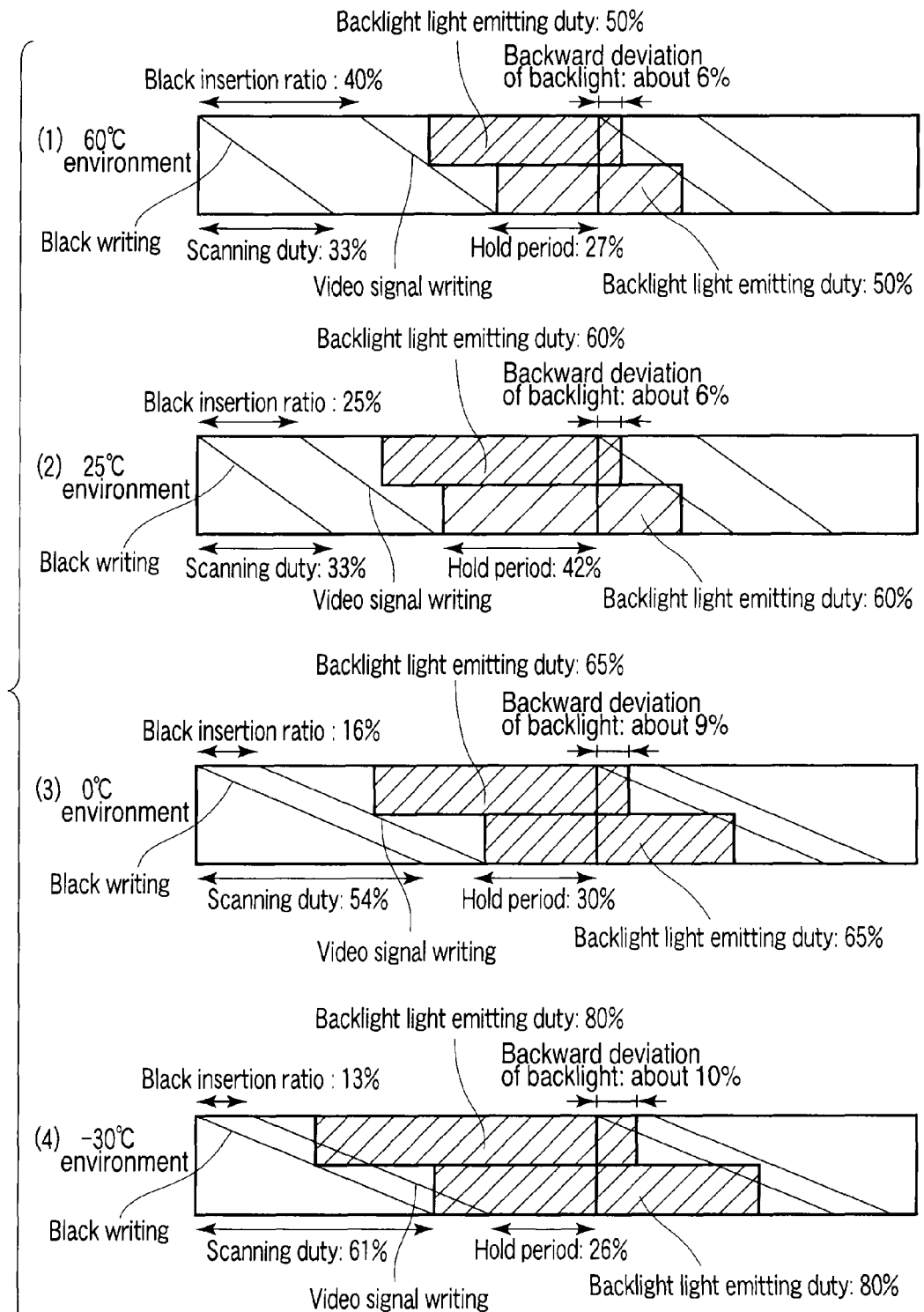
FIG. 8 is a diagram for explaining a driving method of the liquid crystal display apparatus corresponding to a temperature.

FIG. 8 is a diagram for explaining a driving method of the liquid crystal display apparatus corresponding to a temperature.

In the liquid crystal display apparatus, two backlights BL1 and BL2 are arranged on a back surface of the display panel DP in parallel to a line of the OCB liquid crystal pixels. In other words, the backlight is divided into two in the scanning direction.

FIG. 8(2) shows a driving method in a standard state in a normal temperature environment in which the temperature is 25° C. Here, black writing and video signal writing are carried out at 33% scanning duty, but by overlapping portions (8%) thereof on each other, the black insertion ratio becomes 25%, and 42% hold period is realized. Since the black writing and video signal writing are overlapped each other, the scanning period becomes ½ horizontal scanning period, the black writing is carried out in a first half of the one horizontal scanning period, and the video signal writing is carried out in the second half. After the video signal writing is carried out on an upper half screen of the display screen, the corresponding backlight BL1 is lit after predetermined time is elapsed while taking the response of the OCB liquid crystal into account. Then, after the video signal writing is carried out in the lower half of the display screen, the corresponding backlight BL2 is lit after predetermined time is elapsed while taking the response of the OCB liquid crystal into account. The backlights BL1 and BL2 are lit at backlight duty 60%.

FIG. 8(3) shows a driving method in a low temperature environment where the temperature is 0° C. Here, to realize sufficient writing, the video signal writing is set long as long as 54% while the scanning duty at a normal temperature is 33%. When a temperature is low, since the reverse transition is less prone to occur, the black insertion ratio can be reduced. Hence, the black insertion ratio is set to 16% by overlapping portions (38%) of the black writing and the video signal writing each other, and 30% hold period is realized.

To increase the brightness, the backlight BL1 is lit when the video signal writing is completed in the upper half of the display screen. Then, the backlight BL2 is lit when the video signal writing is completed in the lower half of the display screen.

With this, the backlights BL1 and BL2 are lit with longer backlight duty of 65% than that at the normal temperature.

FIG. 8(4) shows a driving method in an extremely low temperature environment of −30° C. for example. To realize more sufficient writing, the black writing and video signal writing are long as long as 61% while the scanning duties at the time of normal temperature and low temperature are 33% and 54%, respectively. When a temperature is extremely low, since the reverse transition is less prone to occur, the black insertion ratio can be reduced. Hence, the black insertion ratio is set to 13% by overlapping portions (48%) of the black writing and the video signal writing each other, and 26% hold period is realized.

To increase the brightness at the extremely low temperature, the backlight BL1 is lit when the black signal writing is completed in the upper half of the display screen. Then, the backlight BL2 is lit when the black signal writing is completed in the lower half of the display screen. In other words, at the timing when the backlight BL1 is lit, the video signal writing is not completed in the upper half of the screen corresponding to the backlight BL1, and at the timing when the backlight BL2 is lit, the video signal writing is not completed in the lower half of the screen corresponding to the backlight BL2.

With this, the backlights BL1 and BL2 are lit with longer backlight duty of 80% than that at the low temperature.

FIG. 8(1) shows a driving method in a high low temperature environment of 60° C.

At the high temperature, since the reverse transition is prone to occur as compared with a case where the temperature is normal, the video writing is carried out when predetermined period is elapsed after the black writing is completed. With this, the black insertion ratio is set to 40% which is greater than that when the temperature is normal. The backlights BL1 and BL2 are lit when the video signal writing is completed in the upper half and lower half of the display screen. The backlights BL1 and BL2 are lit with backlight duty 50% which is shorter than that when the temperature is normal.

Such operation can be realized when the controller circuit 5 controls the timing and light modulation while referring to a table in which the temperature, the backlight duty, the black insertion ratio and the like are defined. FIG. 9 is a diagram showing one example of a table in which a temperature, a backlight duty, a black insertion ratio and the like are defined.

In this table, the backlight duty, the black insertion ratio, the scanning duty and the backlight start timing are defined in correspondence with a temperature. When a plurality of backlights exist, backlight start timing is defined in correspondence with each of the backlights.

In this embodiment, as the temperature is reduced, the scanning duty is increased more, but a hold period during which a video signal is held by the liquid crystal is secured by reducing the black insertion ratio. It is possible to secure sufficient brightness even when the temperature is low by starting the backlight lighting timing before video writing is completed.

In the above-explained second embodiment, since the OCB liquid crystal is prone to be reversely transitioned when the temperature is high, control is performed such that the black insertion ratio is increased, and the black insertion ratio is reduced when the temperature is low. With this, it is possible to more effectively prevent the brightness from being reduced without deteriorating the contrast.

In the second embodiment, the illumination time period of the backlight BL starts early, but the completion of lighting of the backlight BL is delayed as shown in FIG. 8. With this, it is possible to control such that the illumination time period becomes long in correspondence with reduction in temperature.

The backlights BL may be K-number of backlight light sources which are arranged with a predetermined pitch in parallel to a plurality of lines of OCB liquid crystal pixels on a back surface of the display panel DP.

In this case, the lighting timing of the backlights BL may be set such that backlights BL go ON or OFF in association with scanning timing of the corresponding OCB liquid crystal pixels.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A liquid crystal display apparatus comprising:
a display panel which has a plurality of pixel lines each having a plurality of liquid crystal pixels;
an illumination light source which illuminates the display panel; and
a display control section which outputs a signal voltage corresponding to an input video signal sequentially to the pixel lines to write a video signal, and which controls ON/OFF of the illumination light source,
wherein the display control section includes:
a temperature detector which detects temperature information; and
a timing control section which lights the illumination light source after a video signal writing operation into a predetermined pixel line of the display panel is completed when the temperature information in the temperature detector is a first temperature, the video signal writing operation being executed first subsequently to a black writing operation, and which lights the illumination light source before the video signal writing operation into the predetermined pixel line of the display panel is completed when the temperature information in the temperature detector is a second temperature that is lower than the first temperature, the video signal writing operation being executed first subsequently to the black writing operation.

2. The liquid crystal display apparatus according to claim 1, wherein the second temperature is lower than 0° C.

3. The liquid crystal display apparatus according to claim 1, wherein the liquid crystal pixel includes a pair of electrodes, and an OCB liquid crystal disposed between the electrodes.

4. A liquid crystal display apparatus comprising:
a display panel which has a plurality of pixel lines each having a plurality of liquid crystal pixels;
a plurality of illumination light sources which are optically divided at least into two in a direction orthogonal to the pixel line which illuminates the display panel; and
a display control section which outputs a signal voltage corresponding to an input video signal sequentially to the pixel lines to write a video signal, and which controls ON/OFF of the illumination light source,
wherein the display control section includes:
a temperature detector which detects temperature information; and
a timing control section which lights the illumination light source in a corresponding region after a video signal writing operation into a predetermined pixel line of the display panel is completed when the temperature information in the temperature detector is a first temperature, the video signal writing operation being executed first subsequently to a black writing operation, and which lights the illumination light source in a corresponding region before the video signal writing operation into the predetermined pixel line of the display panel is completed when the temperature information in the temperature detector is a second temperature that is lower than the first temperature, the video signal writing operation being executed first subsequently to the black writing operation.

5. The liquid crystal display apparatus according to claim 4, wherein the second temperature is lower than 0° C.

6. The liquid crystal display apparatus according to claim 4, wherein the liquid crystal pixel includes a pair of electrodes, and an OCB liquid crystal disposed between the electrodes.

7. A liquid crystal display apparatus comprising:
a display panel which has a plurality of pixel lines each having a plurality of liquid crystal pixels;
a plurality of illumination light sources which are optically divided at least into two in a direction orthogonal to the pixel line which illuminates the display panel; and
a display control section which outputs a signal voltage corresponding to an input video signal to the display panel after non-video signals are sequentially written on the pixel line by outputting a signal voltage corresponding to a non-video signal to the display panel, thereby sequentially writing the video signal on the pixel line, and which controls ON/OFF of the illumination light source,
wherein the display control section includes:
a temperature detector which detects temperature information; and
a timing control section which lights the illumination light source in a corresponding region after a video signal writing operation into a predetermined pixel line of the display panel is completed when the temperature information in the temperature detector is a first temperature, the video signal writing operation being executed first subsequently to the non-video signal writing operation, and which lights the illumination light source in a corresponding region before the video signal writing operation into the predetermined pixel line of the display panel is completed when the temperature information in the temperature detector is a second temperature that is lower than the first temperature, the video signal writing operation being executed first subsequently to the non-video signal writing operation.

8. The liquid crystal display apparatus according to claim 7, wherein the second temperature is lower than 0° C.

9. The liquid crystal display apparatus according to claim 7, wherein the liquid crystal pixel includes a pair of electrodes, and an OCB liquid crystal disposed between the electrodes.

10. The liquid crystal display apparatus according to claim 7, wherein the timing control section varies an interval between a start time of the writing operation of the non-video signal and a start time of the writing operation of the video signal in accordance with the temperature information.

11. The liquid crystal display apparatus according to claim 10, wherein the timing control section controls that an interval between a start time of the writing operation of the non-video signal and a start time of the writing operation of the video signal at the first temperature is longer than an interval between a start time of the writing operation of the non-video signal and a start time of the writing operation of the video signal at the second temperature.

12. The liquid crystal display apparatus according to claim 7, wherein the illumination light source in a corresponding region is lit after the writing operation of the non-video signal into a predetermined pixel line of the display panel is completed.

* * * * *